US012736664B2

(12) United States Patent
Doerr et al.

(10) Patent No.: US 12,736,664 B2
(45) Date of Patent: Sep. 15, 2026

(54) METHODS AND SYSTEMS FOR ESTIMATING A HEIGHT PROFILE OF A ROAD AROUND A VEHICLE

(71) Applicant: Aptiv Technologies AG, Schaffhausen (CH)

(72) Inventors: Wolfgang Doerr, Wiehl (DE); Jens Westerhoff, Bochum (DE); Premnaath Sukumar, Bangalore (IN); Javitha J, Kumbakonam (IN)

(73) Assignee: Aptiv Technologies AG, Schaffhausen (CH)

( * ) Notice: Subject to any disclaimer, the term of this patent is extended or adjusted under 35 U.S.C. 154(b) by 259 days.

(21) Appl. No.: 18/416,196

(22) Filed: Jan. 18, 2024

(65) Prior Publication Data

US 2024/0248198 A1 Jul. 25, 2024

(30) Foreign Application Priority Data

Jan. 24, 2023 (EP) .................................... 23153110

(51) Int. Cl.

*G01S 13/88* (2006.01)
*B60W 40/06* (2012.01)
*G01S 13/32* (2006.01)
*G01S 13/931* (2020.01)

(52) U.S. Cl.

CPC ........... *G01S 13/882* (2013.01); *B60W 40/06* (2013.01); *G01S 13/32* (2013.01); *G01S 13/931* (2013.01); *B60W 2400/00* (2013.01); *B60W 2420/408* (2024.01); *G01S 2013/9316* (2020.01)

(58) Field of Classification Search

CPC ...... G01S 13/882; G01S 13/32; G01S 13/931; G01S 2013/9316; B60W 40/06; B60W 2420/408; B60W 2400/00

See application file for complete search history.

(56) References Cited

U.S. PATENT DOCUMENTS 10,486,485 B1 * 11/2019 Levinson ........... B60G 17/0162
2019/0170511 A1 6/2019 Maucher et al.
2019/0347820 A1 * 11/2019 Golinsky ............... G05D 1/249
2020/0408897 A1 * 12/2020 Westerhoff .............. G01S 13/89
2021/0183093 A1 * 6/2021 Park ..................... G06V 20/588
2022/0147054 A1 5/2022 Birk (Continued)

FOREIGN PATENT DOCUMENTS

JP 4878870 B2 2/2012

OTHER PUBLICATIONS

Extended European Search Report regarding Application No. 23153110.4, dated Jul. 5, 2023.

(Continued)

*Primary Examiner* — Nazra Nur Waheed

(74) *Attorney, Agent, or Firm* — Harness, Dickey & Pierce, P.L.C.

(57) ABSTRACT

A computer implemented method for estimating a height profile of a road around a vehicle, comprises the following steps carried out by computer hardware components: receiving radar responses captured by a radar sensor mounted on the vehicle; determining an elevation spectrum of the road around the vehicle based on the radar responses; and estimating the height profile based on the elevation spectrum.

20 Claims, 6 Drawing Sheets

(56) References Cited

U.S. PATENT DOCUMENTS

| | | | | |
|---|---|---|---|---|
| 2022/0281456 | A1* | 9/2022 | Giovanardi | G08G 1/0112 |
| 2022/0306121 | A1* | 9/2022 | Xing | G01C 21/3822 |

OTHER PUBLICATIONS

Palm Stephan et al: "Mobile Radar Mapping-Subcentimeter SAR Imaging of Roads", IEEE Transactions On Geoscience and Remote Sensing, IEEE, USA, vol. 56, No. 11, Nov. 1, 2018 (Nov. 1, 2018), pp. 6734-6746, XP011703329, ISSN: 0196-2892, DOI: 10.1109/TGRS.2018.2842643 [retrieved on Oct. 25, 2018].

Zhao, B., Nagayama, T., & Xue, K. (2019). Road profile estimation, and its numerical and experimental validation, by smartphone measurement of the dynamic responses of an ordinary vehicle. pp. 1-32. https://doi.org/10.1016/j.jsv.2019.05.015.

H. Imine, Y. Delanne & N. K. M'Sirdi (2006) Road profile input estimation in vehicle dynamics simulation, Vehicle System Dynamics, 44:4, 285-303, DOI: 10.1080/00423110500333840.

* cited by examiner

300

METHODS AND SYSTEMS FOR ESTIMATING A HEIGHT PROFILE OF A ROAD AROUND A VEHICLE

CROSS-REFERENCE TO RELATED APPLICATION

This application claims the benefit and priority of European patent application number 23153110.4, filed on Jan. 24, 2023. The entire disclosure of the above application is incorporated herein by reference.

FIELD

The present disclosure relates to methods and systems for estimating a height profile of a road around a vehicle.

BACKGROUND

This section provides background information related to the present disclosure which is not necessarily prior art.

Information on the road around a vehicle may be crucial information in various aspects of driving, in particular for at least partially autonomously driving vehicles. Also, a road profile may be needed even at a lowest level of active safety, for example warning a driver.

Accordingly, there is a need to efficiently provide reliable information on the road around a vehicle.

SUMMARY

This section provides a general summary of the disclosure and is not a comprehensive disclosure of its full scope or all of its features.

The present disclosure provides a computer implemented method, a computer system and a non-transitory computer readable medium according to the independent claims. Embodiments are given in the subclaims, the description and the drawings.

In one aspect, the present disclosure is directed at a computer implemented method for estimating a height profile of a road around, for example in front of and/or behind, a vehicle, the following steps performed (in other words: carried out) by computer hardware components: receiving radar responses captured by a radar sensor mounted on the vehicle; determining an elevation spectrum of the road around the vehicle based on the radar responses; and estimating the height profile based on the elevation spectrum.

In other words, a height profile may be estimated based on radar responses acquired by a sensor. The height profile may provide information about the height or elevation relative to a present position of the vehicle, for example ahead of the vehicle or behind the vehicle. In other words, road profile estimation may be provided.

According to various embodiments, the elevation spectrum may be generated by observing the backscattering of the road across elevation. The term "spectrum" may refer to a function of amplitude over some parameter. This term "spectrum" may commonly be considered as function over frequency, but according to various embodiments, a more general definition of function over some parameter may be understood as a "spectrum". In particular, an "elevation spectrum" is a function of amplitude over elevation. The elevation spectrum may be referred to as an elevation range spectrum, since elevation and range are provided as parameters.

Radar processing, for most measurements, observations across range may be provided, and hence, for each elevation angle observations across range may be provided, which may result in a structure across elevation and range.

The elevation spectrum may be a function over elevation and range, or may be discretized in a grid with axes range and elevation (in other words: a grid with one dimension related to range and one dimension related to elevation).

Backscattering of the road may refer to the reflectivity of the road as sensed by a radar system.

According to an embodiment, the observing by the radar system may be implemented as Fast-Chirp FMCW (Frequency-Modulated Continuous Wave) radar which provides for the road for each antenna a data across range.

The term "across elevation" may refer to the process of varying the elevation angle of the observation. For this purpose, the antenna may have a radiation pattern that is narrow in elevation. The radiation pattern that is narrow in elevation may be provided by providing high gain transmit and a receive horn antenna or alternatively with electronic beam steering on transmit like in phase array or with beam steering on receive. Beam steering on receive may mean combining signals from multiple receive antennas for a narrow beam.

The variation across elevation angle may be done mechanically or electronically (in other words: digitally). For example, the beam steering may be varied on receive with a digital signal processor; this means for each elevation angle, the weights are adjusted to combine the signals from the receive antennas.

According to an embodiment, a system for determining the elevation spectrum may include Fast-Chirp FMCW, multiple antennas, beamforming on receive, and no mechanical moving parts.

Information on the height profile may be useful, for example, in determining a control strategy for the vehicle. For example, on an uphill road, a different gear may be chosen for vehicles with a combustion engine, or a higher output voltage or current may be provided to the motor or motors for vehicles with one or more electric motors. Likewise, stronger breaking forces may be applied on a downhill slope.

According to various embodiments, peaks in the radar responses may be determined. According to various embodiments, the elevation spectrum may be determined and/or the height profile may be estimated based on the peaks. It has been found that using the peaks may improve the results of the determination or estimation.

According to various embodiments, height profiles obtained at various points of time may be integrated over time. This may increase estimation accuracy.

According to various embodiments, at least one of the radar responses, the elevation spectrum or the height profile may be filtered, for example to remove outliers. This may provide more robust results.

According to various embodiments, a model may be fitted to the height profile. This may provide a memory efficient way to store the height profile.

According to various embodiments, the radar responses are received from at least one of a forward direction (relative to a driving direction of the vehicle), a rearward direction (relative to a driving direction of the vehicle), a sideward direction (relative to a driving direction of the vehicle), or 360 degrees.

According to various embodiments, the height profile is stored in the vehicle. This may allow future use of the height profile by the vehicle or by other vehicles.

According to various embodiments, the height profile is stored in a cloud storage. This may allow future use of the height profile by the vehicle or by other vehicles.

According to various embodiments, the height profile is fused with data from other vehicles. This may provide an increased accuracy of the height profile.

According to various embodiments, the height profile is fused with data from at least one other sensor. This may provide an increased accuracy of the height profile. The other sensor may for example, be a camera, a mechanical sensor, or a GPS (global positioning system) sensor.

According to various embodiments, the height profile is fused with data provided from an entity different than a vehicle. This may provide an increased accuracy of the height profile. The entity different than a vehicle may for example be a map service, for example an online map service.

According to various embodiments, the elevation profile comprises data in a spatial resolution in a range between 0.005 m and 0.1 m, for example a spatial resolution of at least substantially 0.01 m.

In another aspect, the present disclosure is directed at a computer system, said computer system comprising a plurality of computer hardware components configured to carry out several or all steps of the computer implemented method described herein. The computer system can be part of a vehicle.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

In another aspect, the present disclosure is directed at a vehicle comprising the computer system as described herein and the radar sensor.

In another aspect, the present disclosure is directed at a non-transitory computer readable medium storing instructions which, when executed by a computer, cause the computer to carry out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may for example, be an online data repository or a cloud storage.

The present disclosure is also directed at a computer program for instructing a computer to perform several or all steps or aspects of the computer implemented method described herein.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Exemplary embodiments and functions of the present disclosure are described herein in conjunction with the following drawings, showing schematically.

Corresponding reference numerals indicate corresponding parts throughout the several views of the drawings.

DETAILED DESCRIPTION

Example embodiments will now be described more fully with reference to the accompanying drawings.

Autonomous vehicles and vehicles equipped with advanced driver assistance systems (ADAS) depend on environment perception from sensors. Among those sensors are radar sensors the most robust options as they work at day and night as well as in rain and fog. With such radar sensors, it is common to detect vehicles and obstacles and therefore they are installed in most current vehicles.

Autonomous vehicles depend not only on perceiving traffic participants as cars and pedestrians, but also on perceiving the static environment where the most important object is the road itself.

The road may be characterized in driving direction mainly by its road profile. Such a road profile may for example, include a ramp which limits the maximum speed or the ramp may even be that steep that it cannot be driven at all.

The road profile (which may also be referred to as height profile) may also be the base to express the height of objects relative to the road as is commonly of interest to have heights mainly relative to where the vehicle will be driving.

According to various embodiments, a sensing method to estimate the road profile, for example with existing radar sensors as a software update, may be provided.

Various embodiments may provide road profile estimation in driving direction with automotive radar sensors based on road backscattering.

Various embodiments are based on a radar sensor mounted at a road vehicle, for example mounted at the front in driving direction. That sensor may be mounted in such a way that part of its field of view senses the road. The sensor may measure from road response the elevation spectrum over range. This spectrum may be used for road profile estimation. The spectrum may also be referred to as road spectrum. The road spectrum may be provided as an unmasked road spectrum, or the road spectrum may be provided as a masked road spectrum.

Figure 1A:
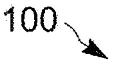
FIG. 1A is an image of a flat road.
Figure 1A:
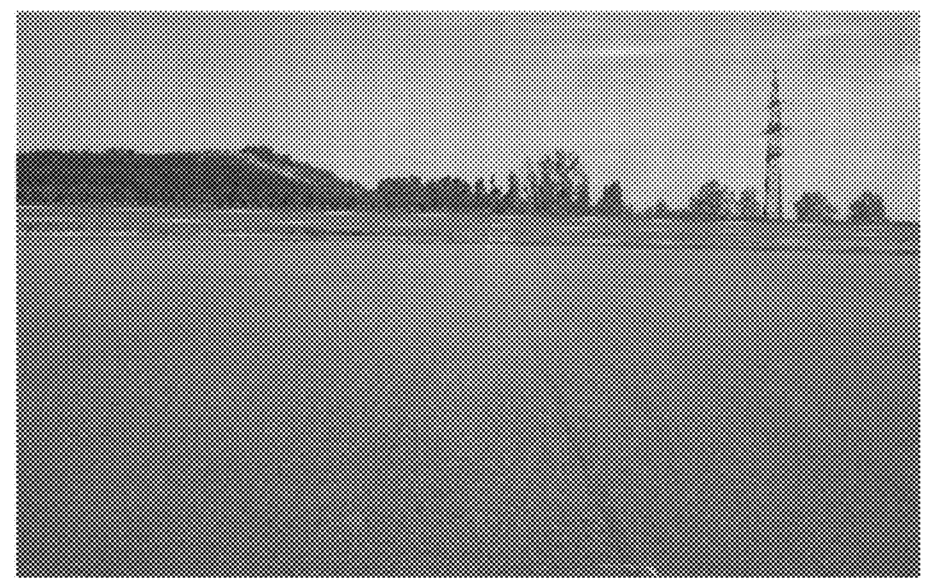

FIG. 1A shows an image 100 of a flat road captured by a vehicle camera.

Figure 1B:
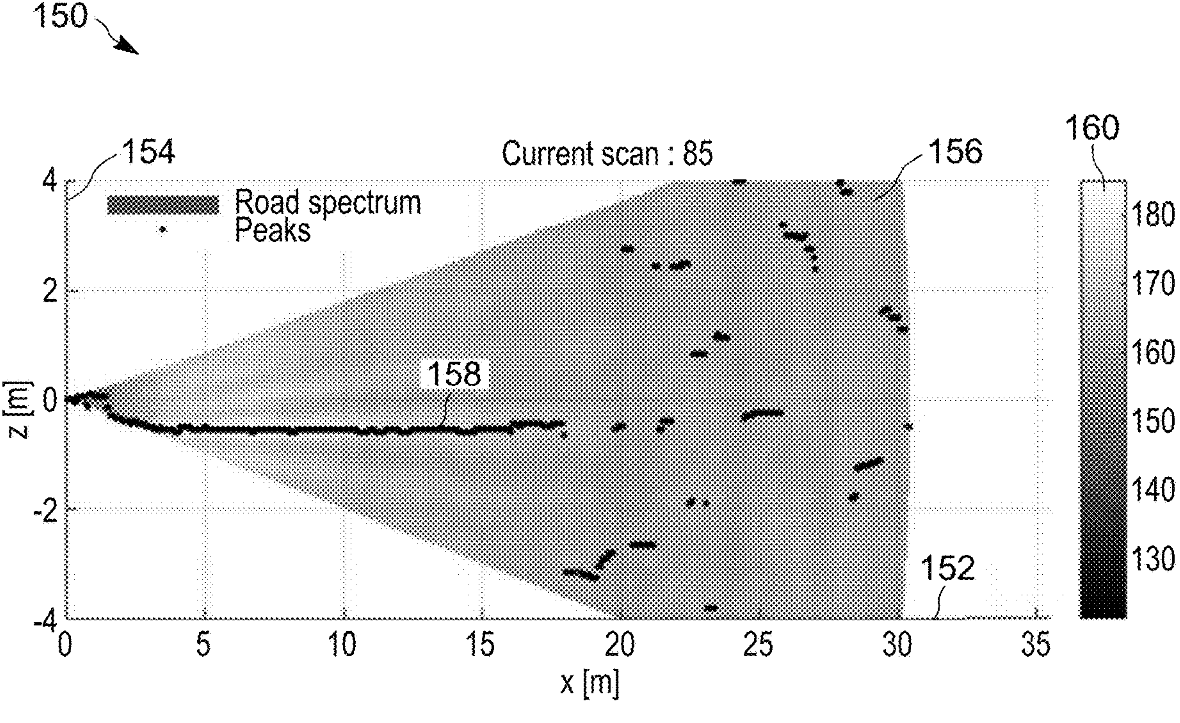
FIG. 1B is an illustration of a height spectrum.

FIG. 1B shows an illustration 150 of a height spectrum 156 from an automotive radar sensor for the flat road as shown in FIG. 1A. FIG. 1B shows an elevation spectrum, here shown as height spectrum.

An elevation spectrum may have as one axis the elevation as angle (e.g. in degrees), while a height spectrum may have an axis in meters. Visually, the elevation spectrum and the height spectrum may look the same and only the coordinate system may be different.

The x-axis 152 may indicate the driving direction, the z-axis 154 may indicate a height relative to the sensor, and gray scale 160 may represent the amplitude with markers 158 indicating peaks. The road may be about 0.5 m below the sensor and may clearly be visible with this sensor up to about 18 m.

Figure 2A:
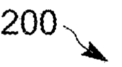
FIG. 2A is an image of a highway ramp
Figure 2A:

FIG. 2A shows an image 200 of a highway ramp captured by a vehicle camera.

Figure 2B:
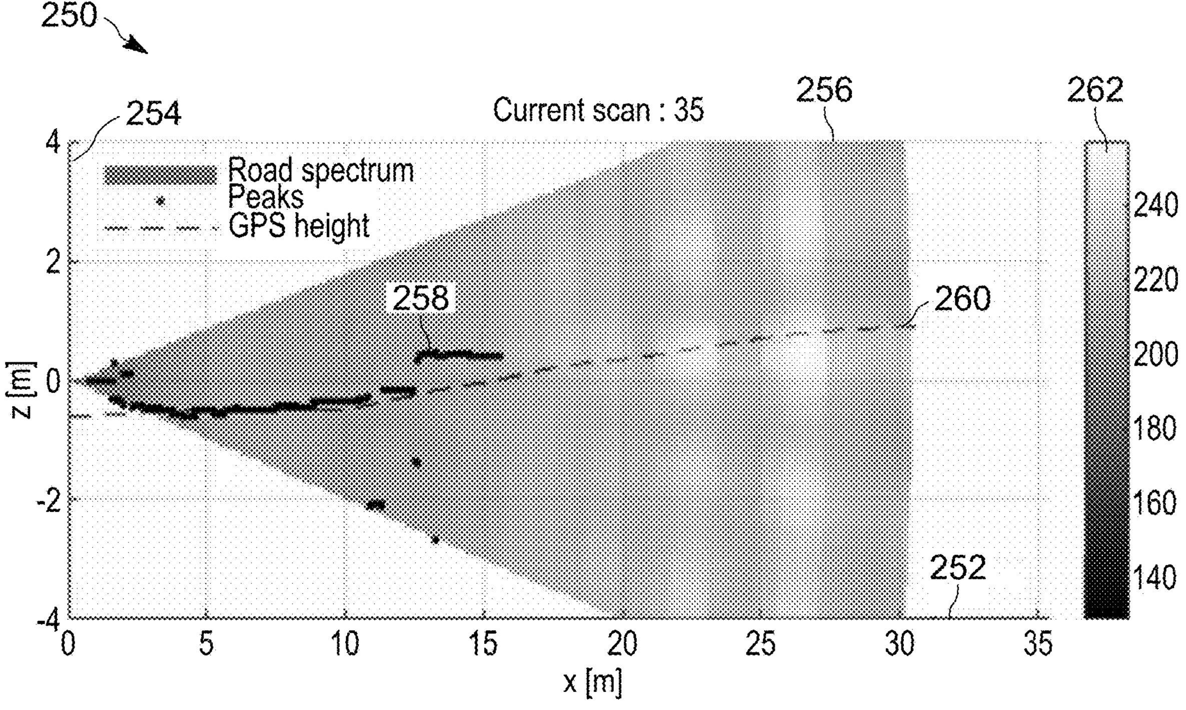
FIG. 2B is an illustration of a height spectrum.

FIG. 2B shows an illustration 250 of a height spectrum 256 from an automotive radar sensor for the highway ramp as shown in FIG. 2A. FIG. 2A shows a ramp on a highway as an example of non-flat road scenarios. The highway may elevate within 20 m by 2 m as indicated by the GPS height ground truth 260. The height spectrum 256 from the radar gives a clear profile up to 12 m. The x-axis 252 may indicate the driving direction, the z-axis 254 may indicate a height relative to the sensor, and gray scale 262 may represent the amplitude with markers 258 indicating peaks.

Figure 3A:
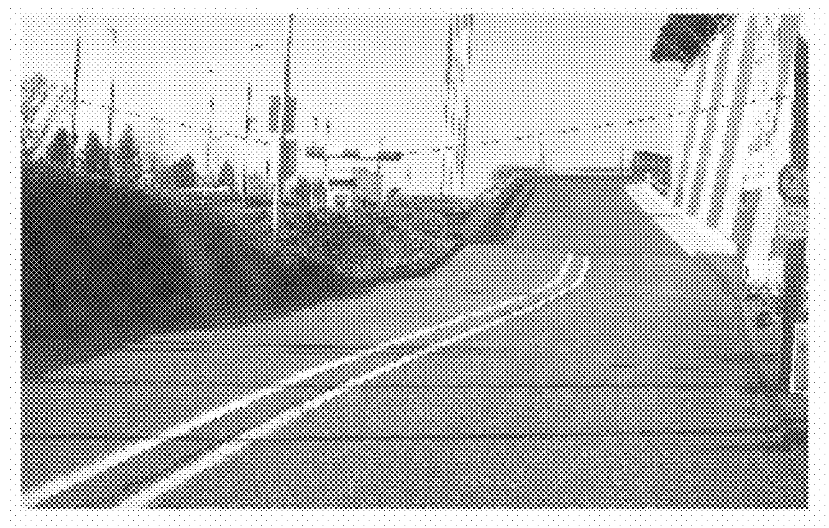
FIG. 3A is an image of a driveway.
Figure 3B:
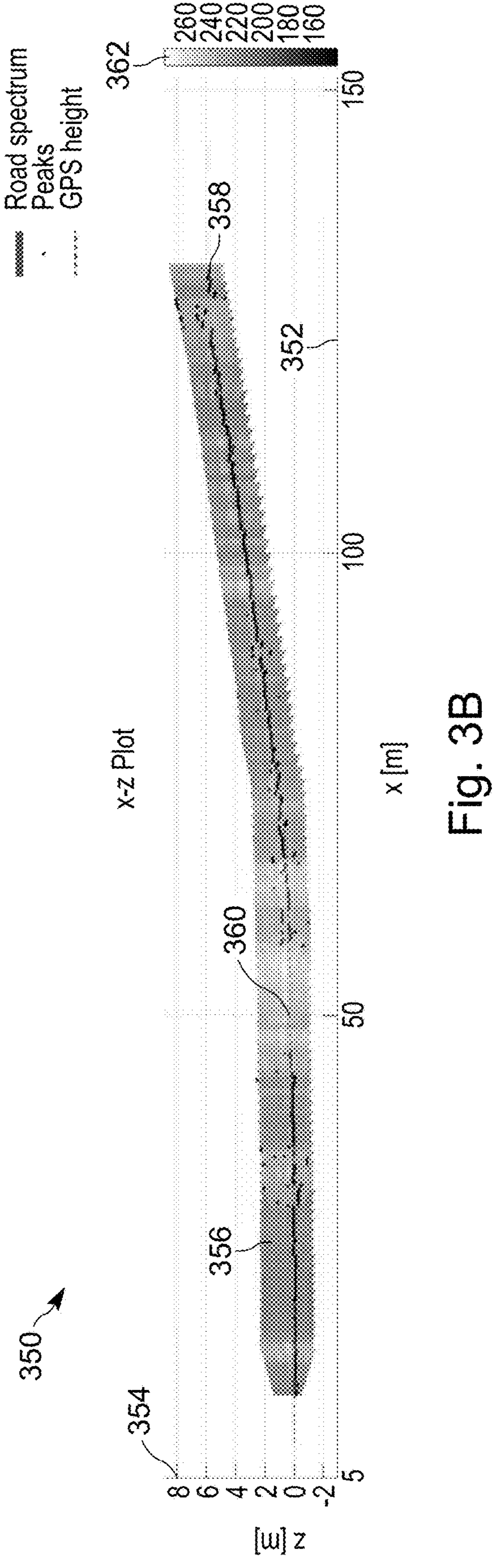
FIG. 3B is an illustration of a height spectrum.

According to various embodiments, the instantaneous radar road response may be combined to an integrated response to extend the coverage as shown in FIG. 3A and FIG. 3B. These figures show a driveway to the parking on the roof of building.

FIG. 3A shows an image 300 of a driveway captured by a vehicle camera.

FIG. 3B shows an illustration 350 of a height spectrum 356 from an automotive radar sensor for the driveway as shown in FIG. 3A. The driveway may go uphill as indicated by the GPS height ground truth 360. The x-axis 352 may indicate the driving direction, the z-axis 354 may indicate a height relative to the sensor, and gray scale 362 may represent the amplitude with markers 358 indicating peaks.

As described herein, the road profile may be estimated with a radar sensor installed in a vehicle. Road profile estimation may be provided based on radar backscattering. Integration over time may be used to increase estimation accuracy. Peak finding may be used for discrete representation. Robust filtering may be used to remove outliers. Parameter estimation may be used to fit a model to the road profile. Road sensing may be applied in all directions (forward, rearward, sideward, 360 deg). The same method of sensing the road surface may be used to sense other surfaces (for example ceiling and walls in a parking garage). The road profile may be stored (for example in the vehicle or a cloud storage) for future use by the same or other vehicles. The road profile may be fused with data from other vehicles. The road profile may be fused with other sensing modalities (for example camera, mechanical sensors, GPS). The road profile may be fused with data not from vehicles (e.g. map services).

Figure 4:
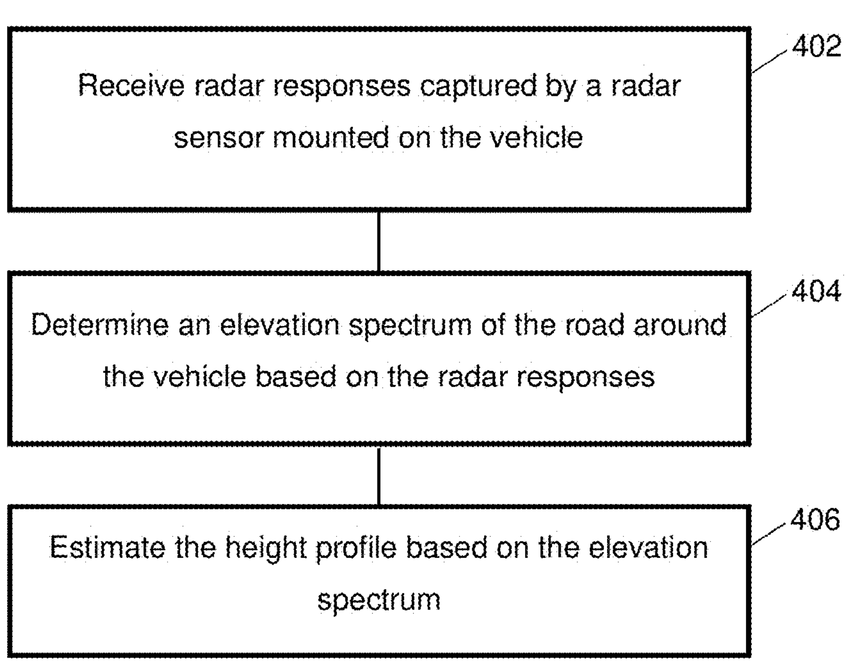
FIG. 4 is a flow diagram illustrating a method for estimating a height profile of a road around a vehicle according to various embodiments.

FIG. 4 shows a flow diagram 400 illustrating a method for estimating a height profile of a road around a vehicle according to various embodiments. At 402, radar responses captured by a radar sensor mounted on the vehicle may be received. At 404, an elevation spectrum of the road around the vehicle may be determined based on the radar responses. At 406, the height profile may be estimated based on the elevation spectrum.

According to various embodiments, the method may further include determining peaks in the radar responses; wherein the elevation spectrum is determined and/or the height profile is estimated based on the peaks.

According to various embodiments, the method may further include integrating height profiles obtained at various points of time over time.

According to various embodiments, the method may further include filtering at least one of the radar responses, the elevation spectrum or the height profile.

According to various embodiments, the method may further include fitting a model to the height profile.

According to various embodiments, the radar responses may be received from at least one of a forward direction, a rearward direction, a sideward direction, or 360 degrees.

According to various embodiments, the method may further include storing the height profile in the vehicle.

According to various embodiments, the method may further include storing the height profile in a cloud storage.

According to various embodiments, the method may further include fusing the height profile with data from other vehicles.

According to various embodiments, the method may further include fusing the height profile with data from at least one other sensor.

According to various embodiments, the method may further include fusing the height profile with data provided from an entity different than a vehicle.

According to various embodiments, the elevation profile may include data in a spatial resolution in a range between 0.005 m and 0.1 m, for example a spatial resolution of at least substantially 0.01 m.

Each of the steps 402, 404, 406, and the further steps described above may be performed by computer hardware components.

Figure 5:
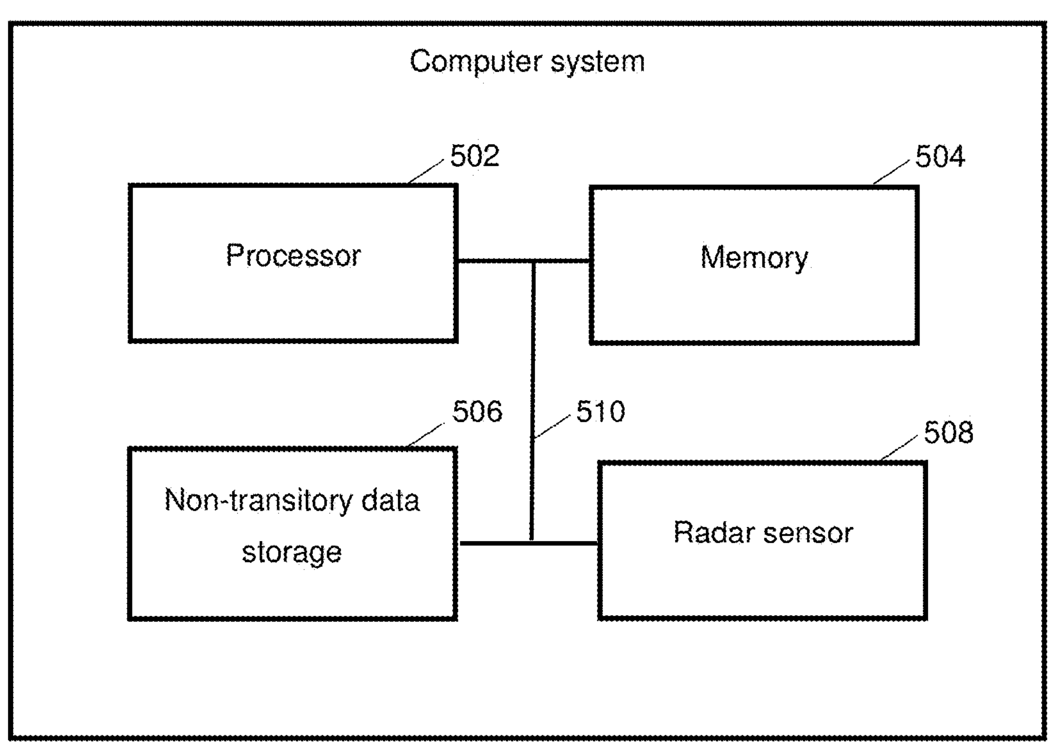
FIG. 5 is a block diagram of a computer system with a plurality of computer hardware components configured to carry out steps of a computer implemented method for estimating a height profile of a road around a vehicle according to various embodiments.

FIG. 5 shows a computer system 500 with a plurality of computer hardware components configured to carry out steps of a computer implemented method for estimating a height profile of a road around a vehicle according to various embodiments. The computer system 500 may include a processor 502, a memory 504, and a non-transitory data storage 506. A radar sensor 508 may be provided as part of the computer system 500 (like illustrated in FIG. 5), or may be provided external to the computer system 500.

The processor 502 may carry out instructions provided in the memory 504. The non-transitory data storage 506 may store a computer program, including the instructions that may be transferred to the memory 504 and then executed by the processor 502. The radar sensor 508 may be used for capturing the radar responses.

The processor 502, the memory 504, and the non-transitory data storage 506 may be coupled with each other, e.g. via an electrical connection 510, such as e.g. a cable or a computer bus or via any other suitable electrical connection to exchange electrical signals. The radar sensor 508 may be coupled to the computer system 500, for example via an external interface, or may be provided as parts of the computer system (in other words: internal to the computer system, for example coupled via the electrical connection 510).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the computer system 500.

REFERENCE NUMERAL LIST

100 image of a flat road
150 illustration of a height spectrum
152 x-axis
154 z-axis
156 height spectrum
158 markers indicating peaks
160 gray scale
200 image of a highway ramp
250 illustration of a height spectrum
252 x-axis
254 z-axis
256 height spectrum
258 markers indicating peaks
260 height ground truth
262 gray scale
300 image of a driveway
350 illustration of a height spectrum
352 x-axis
354 z-axis
356 height spectrum
358 markers indicating peaks
360 height ground truth
362 gray scale
400 flow diagram illustrating method for estimating a height profile of a road around a vehicle
402 step of receiving radar responses captured by a radar sensor mounted on the vehicle
404 step of determining an elevation spectrum of the road around the vehicle based on the radar responses
406 step of estimating the height profile based on the elevation spectrum
500 computer system according to various embodiments
502 processor
504 memory
506 non-transitory data storage
508 radar sensor
510 connection

What is claimed is:

1. A computer implemented method for estimating a height profile of a road around a vehicle,
the method comprising the following steps carried out by computer hardware components:
receiving radar responses captured by a radar sensor mounted on the vehicle;
determining an elevation spectrum of the road around the vehicle based on the radar responses;
estimating the height profile based on the elevation spectrum; and
controlling an operation of the vehicle based on the height profile of the road around the vehicle;
wherein:
the elevation spectrum is a function over elevation and range or is discretized in a grid with axes range and elevation; and
the elevation spectrum has as one axis the elevation as angle.

2. The computer implemented method of claim 1, further comprising the following step carried out by the computer hardware components:
determining peaks in the radar responses;
wherein the elevation spectrum is determined and/or the height profile is estimated based on the peaks.

3. The computer implemented method of claim 1, further comprising the following step carried out by the computer hardware components:
integrating height profiles obtained at various points of time over time.

4. The computer implemented method of claim 1, further comprising the following step carried out by the computer hardware components:
filtering at least one of the radar responses, the elevation spectrum or the height profile.

5. The computer implemented method of claim 1, further comprising the following step carried out by the computer hardware components:
fitting a model to the height profile.

6. The computer implemented method of claim 1, wherein the radar responses are received from at least one of a forward direction, a rearward direction, a sideward direction, or 360 degrees.

7. The computer implemented method of claim 1, further comprising the following step carried out by the computer hardware components:
storing the height profile in the vehicle.

8. The computer implemented method of claim 1, further comprising the following step carried out by the computer hardware components:
storing the height profile in a cloud storage.

9. The computer implemented method of claim 1, further comprising the following step carried out by the computer hardware components:
fusing the height profile with data from other vehicles.

10. The computer implemented method of claim 1, further comprising the following step carried out by the computer hardware components:
fusing the height profile with data from at least one other sensor.

11. The computer implemented method of claim 1, further comprising the following step carried out by the computer hardware components:
fusing the height profile with data provided from an entity different than a vehicle.

12. The computer implemented method of claim 1,
wherein the elevation profile comprises data in a spatial resolution between 0.005 m and 0.1 m, or 0.01 m.

13. A system for estimating a height profile of a road around a vehicle, the system comprising computer hardware components configured to:
receive radar responses captured by a radar sensor mounted on the vehicle;
determine an elevation spectrum of the road around the vehicle based on the radar responses;
estimating the height profile based on the elevation spectrum; and
control an operation of the vehicle based on the height profile of the road around the vehicle;
the elevation spectrum is a function over elevation and range or is discretized in a grid with axes range and elevation; and
the elevation spectrum has as one axis the elevation as angle.

14. A vehicle that includes the system of claim 13.

15. The system of claim 13, wherein the computer hardware components are further configured to:
determine peaks in the radar responses;
wherein the elevation spectrum is determined and/or the height profile is estimated based on the peaks.

16. The system of claim 13, wherein the computer hardware components are further configured to:

integrate height profiles obtained at various points of time over time.

17. A non-transitory computer readable medium storing instructions that, when executed by computer hardware components, configure the computer hardware components to estimate a height profile of a road around a vehicle, by:

receiving radar responses captured by a radar sensor mounted on the vehicle;

determining an elevation spectrum of the road around the vehicle based on the radar responses;

estimating the height profile based on the elevation spectrum;

control an operation of the vehicle based on the height profile of the road around the vehicle;

wherein:

the elevation spectrum is a function over elevation and range or is discretized in a grid with axes range and elevation; and the elevation spectrum has as one axis the elevation as angle.

18. The non-transitory computer readable medium of claim 17, wherein the instructions, when executed by the computer hardware components, further configure the computer hardware components to:

determine peaks in the radar responses;

wherein the elevation spectrum is determined and/or the height profile is estimated based on the peaks.

19. The non-transitory computer readable medium of claim 17, wherein the instructions, when executed by the computer hardware components, further configure the computer hardware components to:

integrate height profiles obtained at various points of time over time.

20. The non-transitory computer readable medium of claim 17, wherein the instructions, when executed by the computer hardware components, further configure the computer hardware components to:

filter at least one of the radar responses, the elevation spectrum or the height profile.

* * * * *